Sept. 15, 1936. W. E. SHARP 2,054,393
LOCK NUT AND METHOD OF MAKING
Original Filed May 25, 1929
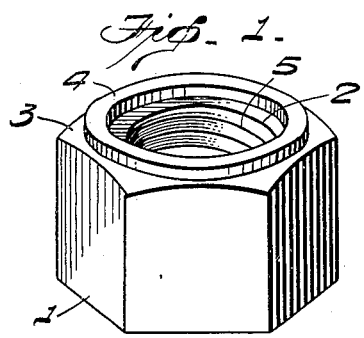
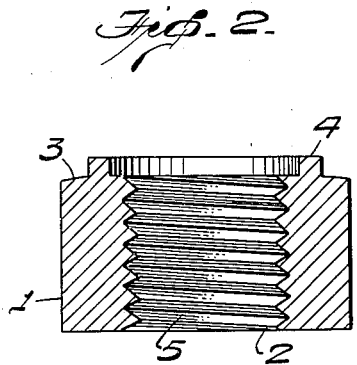
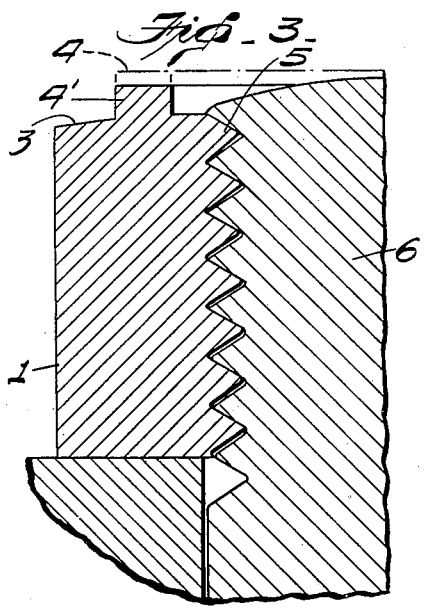
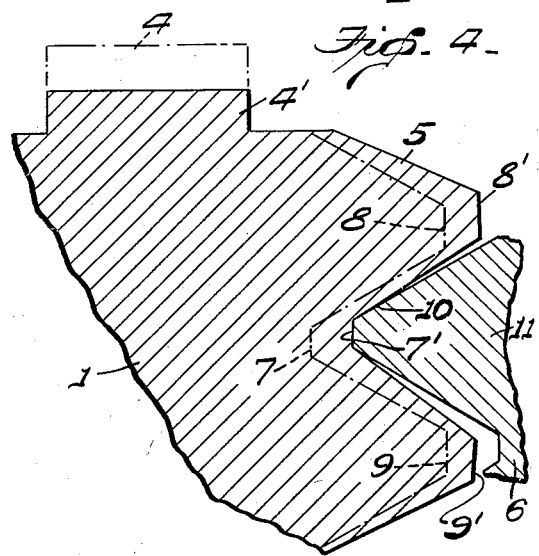
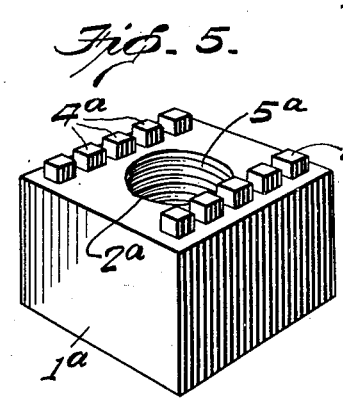
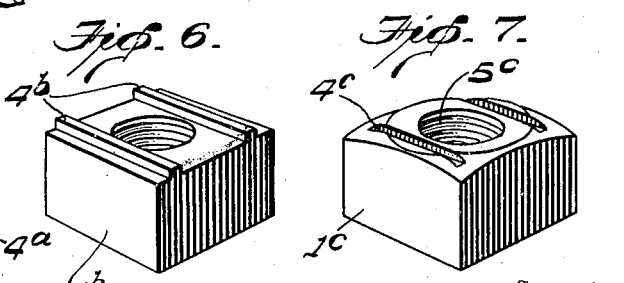
Inventor
William E. Sharp, Dec'd
By Minnie E. Sharp, Executrix
By Towson Price
Attorney Patented Sept. 15, 1936

2,054,393

UNITED STATES PATENT OFFICE 2,054,393

LOCK NUT AND METHOD OF MAKING

William E. Sharp, deceased, late of Chicago, Ill., by Minnie E. Sharp, executrix, Chicago, Ill.

Original application May 25, 1929, Serial No. 365,918. Divided and this application July 6, 1936, Serial No. 89,214

18 Claims. (Cl. 10—86)

This application is a division of application Serial No. 365,918, filed by my testator, William E. Sharp, on May 25, 1929.

This invention relates to lock nuts and, more particularly, to an improved nut of the character which is readily applied to an associated bolt, but which binds thereon for a few of the outermost threads.

The principal object of the invention, generally considered, is to provide a threaded nut with a portion which has been compressed into the body thereof to push the adjacent threads downwardly and toward the center of the nut, causing them to be tilted or partially rolled over, whereby they will bind upon an associated bolt.

Another object of the invention is to provide a lock nut involving a threaded nut in which a portion thereof slightly beyond the root of the threads of said nut is compressed into the body thereof to squeeze the roots of the adjacent threads inwardly, reduce the distance between adjacent sides of adjacent threads at the roots thereof, and cause them to bind upon an associated bolt of the proper size so that the nut will be securely held thereon without, however, damaging the threads on said bolt.

A further object of the invention is to provide a process or method of forming lock nuts involving applying pressure to force a portion of one face of a threaded nut partly into the body thereof to cause the metal adjacent thereto to flow downwardly and slightly decrease the distance between adjacent threads at their roots adjacent said face of the blank.

Other objects and advantages of the invention relating to the particular arrangement and construction of the various parts will become apparent as the description proceeds.

Referring to the drawing illustrating the invention, the scope whereof is defined by the appended claims:

Figure 1 is a perspective view of one form of nut before the threads thereof have been distorted in accordance with the invention.

Figure 2 is a vertical sectional view through a pair of oppositely disposed flat sides of a nut such as shown in Figure 1.

Figure 3 is a fragmentary sectional view, corresponding to Figure 2, on an enlarged scale and showing the form of the nut after the projection or collar has been compressed into the body of the blank to give it the desired locking properties, a portion of an associated bolt being shown as applied to the nut after said nut has been given the desired locking properties.

Figure 4 is a further enlarged fragmentary sectional view illustrating more clearly a typical distortion of nut threads in accordance with the invention.

Figures 5, 6, and 7 are perspective views corresponding to Figure 1 but showing other embodiments of the invention.

Referring to the drawing in detail, like parts being designated by like reference characters, and first considering the embodiment of the invention illustrated in Figures 1, 2 and 3, there is shown a nut 1 of hexagonal form, although it will be obvious that a blank of square or other form may be used, if desired. Said nut is provided with a bolt hole 2, and from one face, preferably the upper or outermost face 3 is a projection 4. In the present embodiment of the projection is annular and preferably concentric with the bolt hole 2, the inner diameter of said projection preferably corresponding with, or being slightly greater than, the root diameter of the threads 5 which are applied to the blank at the bolt hole 2 to produce the nut or threaded unfinished lock nut. Although the annular projection 4 is shown as being rectangular or approximately square in cross section, it is obvious that the invention is not limited to this construction.

In Figure 3 there is shown a nut embodying the invention and a bolt which was inserted subsequent to applying the locking properties to the nut. The dot and dash lines in this figure, designated by the reference character 4, indicate the projection or upstanding collar before it was deflected or compressed into the nut to the extent indicated by the solid lines 4'. This deflection of the collar causes a flow of metal into the body of the blank, and because said collar is nearer the roots of the threads than the outer periphery of the blank, the main result of the deflection is to cause the metal adjacent the outermost or topmost threads to flow inwardly and slightly squeeze or contract the threads especially at the roots.

The crests of said threads, however, are naturally forced inward with the root portions, which causes a tilting or partial rolling over of such threads and a contraction in diameter of the nut, so that when the nut 1 is screwed on the bolt 6, it will go thereon as an ordinary nut until the last few threads, adjacent the outer or topmost face, reach the outer threads on the bolt, when the threads on said nut will bind upon the bolt threads, particularly the outer edge or top of the outermost engaged bolt thread, and lock to the desired extent. On account of the thread distortion being slight, the desired locking action is secured without resulting in appreciable permanent deformation of the threads of the bolt to which it is applied.

Figure 4 is an enlarged diagrammatic view representing, in an exaggerated way, a typical thread distortion due to compressing the collar 4 into the body of the nut to the position designated by the reference character 4', the distorted nut section being superimposed over the undistorted section with the top faces of said sections in registry, in order to most clearly show the general character of the thread distortion under normal conditions. On account of the collar 4 being quite near the roots of the threads 5, the metal of said collar which is pushed into the body of the nut 1, goes diagonally downward and inward crowding the root portion between the two top threads from the position designated by the reference character 7, to that designated by the reference character 7', and simultaneously pushing the crest of the upper thread from the position 8 to the position 8', and the crest of the second thread from the position 9 to the position 9'.

On account of the upper root portion of the top thread not having a tendency to move as much as the lower root portion, and the lower root portion of the next to the top thread not having a tendency to move as much as the upper root portion, a typical action of such threads is a tilting over such as is illustrated in this figure. The relative distortion of the upper nut threads, as compared with the receiving valleys between associated bolt threads, causes a bending of thread crests and a corresponding locking action when the bolt is screwed in place. On account of the crowding of the root, as indicated at 7', there is a tendency for the root portion between the top thread of the nut and that thread immediately below it, to bind upon the crest portion 10 of the top thread 11 of the bolt 6, a fragmentary portion only of which is shown. The binding action of the next to the top nut thread on the engaged bolt thread is satisfactory but usually different from the binding action illustrated, because it is generally tilted and distorted to a different extent than the top thread.

Referring now to the embodiment of the invention illustrated in Figure 5, there is shown a nut blank 1ᵃ which is square rather than hexagonal, although as will be understood, the same may be formed hexagonal or any other desired form within the spirit and scope of the invention. Instead of using an annular projection as in the first embodiment, there is employed a plurality of outstanding projections 4ᵃ which may involve two parallel rows of projections, the inner edges of said rows being disposed adjacent or slightly outwardly of the roots of the threads 5ᵃ at the bolt hole 2ᵃ of the nut. If desired, the projections may be elongated and formed as two parallel relatively long extensions, as shown at 4ᵇ on the nut 1ᵇ in Figure 6, rather than two parallel rows of short extensions.

Referring now to the embodiment of the invention illustrated in Figure 7, there is shown a nut 1ᶜ threaded at 5ᶜ like the nut of Figures 5 and 6. Said nut is illustrated as square like the nuts of Figures 5 and 6, although it will be understood that it may, if desired, be formed hexagonal as shown in Figures 1 and 2. Instead of having projections from the top face thereof, as in the previous embodiment, said nut 1ᶜ may be formed plane faced and have the top face thereof depressed along parallel grooves, as indicated at 4ᶜ, said grooves being positioned adjacent the roots of the threads 5ᶜ and preferably disposed slightly outwardly thereof like the projections 4ᵇ in Figure 6. The effect of compressing the metal of the nut 1ᶜ to produce the grooves 4ᶜ, disposed like the ridges or extensions 4ᵇ of Figure 6, is substantially identical with that produced in connection with the formation of the lock nut shown in Figure 6, in that the metal adjacent the topmost threads is caused to flow inwardly and slightly squeeze said threads more particularly at the roots thereof, thereby reducing the distance between adjacent threads slightly to cause said threads to bind upon a correspondingly threaded bolt on both sides of the threads thereof, particularly at the tops of said threads.

On account of the position at which the deflecting tool is applied to the standard or commercial form of nut to produce the pressure grooves 4ᶜ, as shown in Figure 7, the metal of the nut flows both inwardly toward the axis of the nut and along the bolt hole parallel to the axis in the direction of movement of the die. The fact that the tool is applied nearer the bolt hole than the outer surfaces of the nut causes practically all of the lateral movement to be inward rather than outward, giving a resultant diagonal movement to the deflected metal. As a result of the metal movement, the threads are given a slight wave, and the hole is slightly flattened at the opposite sides adjacent the grooves 4ᶜ. The waved portions of the threads, that is, the portions of the surface of the hole which are distorted, taper from the upper surface of the nut toward the original surface of cylindrical form on which the threads are applied. Not only are the threads waved and flattened by the pressing operation, but there is likewise a rolling-over or angular displacement of the threads themselves, which may be referred to as a protrusion effect, whereby the rolled-over threads will be caused to grip the threads of an associated bolt, so that accidental removal of the nut is avoided. When the bolt is screwed into the nut, there is a gradual locking effect due both to the wave of the threads and the protrusion of the parts, but neither the thread wave nor the flattened effect is sufficient to damage the threads of the bolt.

Instead of making the nut 1ᶜ as a plane faced nut, it will, of course, be obvious that, if desired, it may be made with grooves 4ᶜ thereon initially and subsequently the metal may be compressed in said grooves.

The foregoing discloses a lock nut and process of making the same in which some of the threads of an ordinary or standard nut are distorted to provide a locking action. One form of the invention involves the formation, on one face of the nut, of an annular projection concentric with the bolt hole and having an inner diameter corresponding with, or being slightly greater than, the root diameter of the nut threads, said projection being partly compressed into the body of the nut to modify the threads adjacent thereto, so that they will bind upon an associated bolt when the nut is applied thereto. In this form the metal of the nut is crowded, causing a slight contraction of the diameter of the nut adjacent the top face, or that which carries the annular projection, as well as involving a tilting of the nut threads adjacent said contracted portion.

In the form of the invention in which the metal is distorted or forced into the nut on two opposite sides of the bolt hole, as by forcing in parallel projections or by compressing to form parallel grooves on opposite sides of the bolt hole, the action on the threads is slightly different, in that the diameter of the bolt hole is not contracted around the full periphery, but the hole is rather elongated or flattened at opposite sides, and the threads are waved or displaced longitudinally adjacent said parallel deflected portions, as well as being tilted or partially rolled over, as compared with the thread portions between said parallel deflected portions, so that such lock nuts do not give exactly the same locking action as those in which the metal is distorted around the full periphery. However, in all forms of the invention the distortion is at or adjacent the root threads, so that the metal, at the positions where the distortion takes place, is caused to move both longitudinally and radially inward of the nut, so that the resultant displacement is diagonal toward the nut axis.

Although preferred forms of the invention have been disclosed, it will be understood that modifications may be made therein within the spirit and scope of the appended claims.

What is claimed is:

1. The process of forming a lock nut comprising making a blank with an upright sided projection extending from one face thereof and with its inner side spaced from the bolt hole, threading said blank and applying pressure to said projection to cause the metal adjacent the roots of the threads to flow inwardly and slightly distort said threads.

2. The process of forming a lock nut comprising making a threaded blank with an approximately rectangular projection upstanding from one face thereof adjacent the roots of the threads and with its inner side spaced from the bolt hole, applying pressure to said projection to force the metal thereof into said blank and cause the threads adjacent thereto to be distorted, whereby they will bind upon an associated bolt.

3. The process of forming a lock nut comprising making a blank with an annular collar on one face thereof, the inner edge of said collar being spaced from the bolt hole, threading said blank to form a nut and applying pressure to said collar to cause the metal adjacent thereto to flow inwardly, causing the root portions of threads adjacent said collar to be crowded.

4. The process of forming a lock nut comprising making a threaded blank with an annular collar upstanding from the top face thereof, said collar being disposed so that its inside diameter is slightly larger than the diameter of the nut at the roots of the threads, and applying pressure to force the collar partly into the body of the nut and cause the threads adjacent the top face of the nut to be distorted adjacent the roots thereof, whereby they will bind upon corresponding threads, of an associated bolt, adjacent the top thereof.

5. A lock nut comprising a threaded blank with a distorted portion on one face thereof, said portion having its inner edge spaced slightly outward from the roots of the threads and having been compressed to cause the threads adjacent thereto to be crowded especially adjacent the roots, whereby said threads will bind upon an associated bolt.

6. A lock nut comprising a threaded blank with an upstanding projection on its top face, said projection being disposed adjacent and outwardly of the roots of the threads and being compressed into the body of the nut so that the threads adjacent thereto will contract slightly especially adjacent the roots thereof to cause them to bind upon an associated bolt.

7. A lock nut comprising a threaded blank with an annular collar on one face thereof, said collar having an inner diameter greater than the thread root diameter and having been compressed to cause the threads adjacent thereto to be slightly contracted and crowded at the roots.

8. A lock nut comprising a threaded blank with an annular upstanding collar on the top face thereof, the inner diameter of said collar being slightly greater than the diameter at the roots of the threads, said collar being concentric with the threads and slightly compressed into the body of the nut so that said threads adjacent the top face of the nut are contracted slightly and have their root portions crowded together, causing them to bind upon an associated bolt.

9. The process of forming a lock nut comprising making a threaded blank with an annular collar substantially rectangular in section upstanding from the top face thereof, said collar having an inside diameter slightly larger than the thread root diameter and an outside diameter less than the outside dimensions of the nut, and applying pressure to said collar to force it partly into the body of the nut and cause the threads adjacent the top face thereof to be contracted at the roots whereby they will bind the engaging portions of threads upon an associated bolt.

10. A lock nut formed with an annular upstanding collar substantially rectangular in section, with its inner diameter slightly greater than the thread root diameter, concentric with said threads, and slightly compressed into the body of the nut so that the threads adjacent the top face thereof are contracted, especially at the root, to cause them to bind upon an associated bolt.

11. A lock nut in which the threads adjacent one face thereof are slightly contracted, especially adjacent the roots, whereby they will bind the outermost portions of corresponding threads on an associated bolt.

12. The method of converting a standard nut into a lock nut which comprises pressure-indenting an end portion to wave the thread adjacent thereto and displace the metal at the periphery of the hole both inwardly toward the axis of the nut and longitudinally of the nut.

13. The method of converting a standard nut into a lock nut which comprises displacing the metal at the periphery of the hole both inwardly toward the axis of the nut and longitudinally of the nut, whereby a portion of the thread of the nut is partially rolled over during the displacing of the metal at the periphery of the hole.

14. A lock nut having a partially rolled over wavy thread.

15. A lock nut having a partially rolled over wavy thread and the hole provided with a flattened portion where the threads are waved.

16. A lock nut formed from a standard nut and having a portion of the metal at the periphery of the hole pressed longitudinally and laterally of the nut and the thread waved.

17. A lock nut formed from a standard nut and having a portion of the metal at the periphery of the bolt hole pressed longitudinally and laterally of the nut and the thread waved and partially rolled over.

18. The method of converting an ordinary threaded metal nut into a lock nut, which comprises displacing an annular portion of the metal concentric with the bolt hole into said nut, said annular portion being so near the roots of the nut threads that the metal defining the periphery of the hole is displaced inwardly toward the axis of the nut as well as longitudinally, whereby portions of the threads of the nut are tilted so that they will grip engaging portions of an associated bolt.

MINNIE E. SHARP,
*Executrix of the Estate of William E. Sharp, Deceased.*